Figure 1:
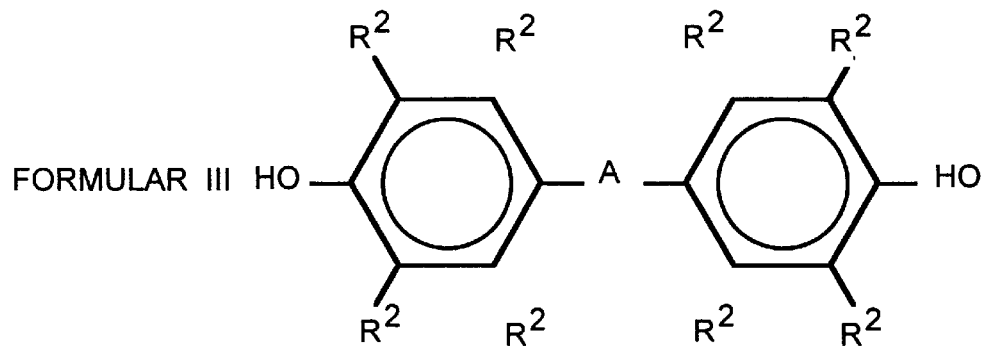
Figure 1:
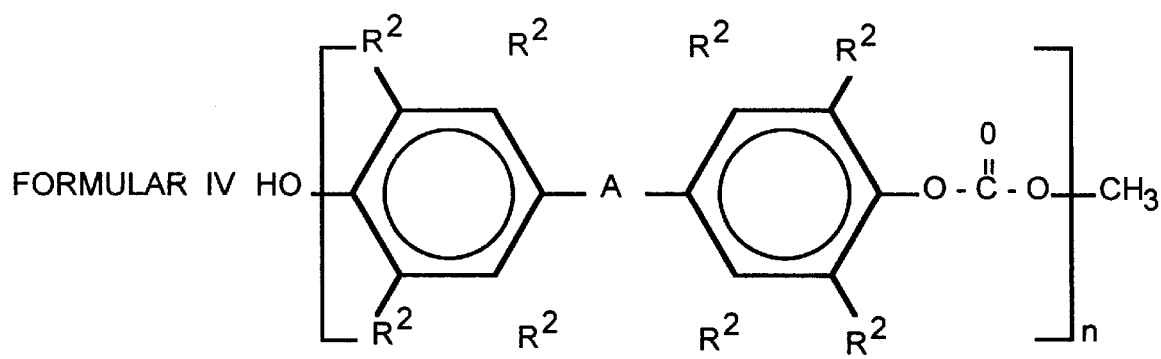
Figure 1:
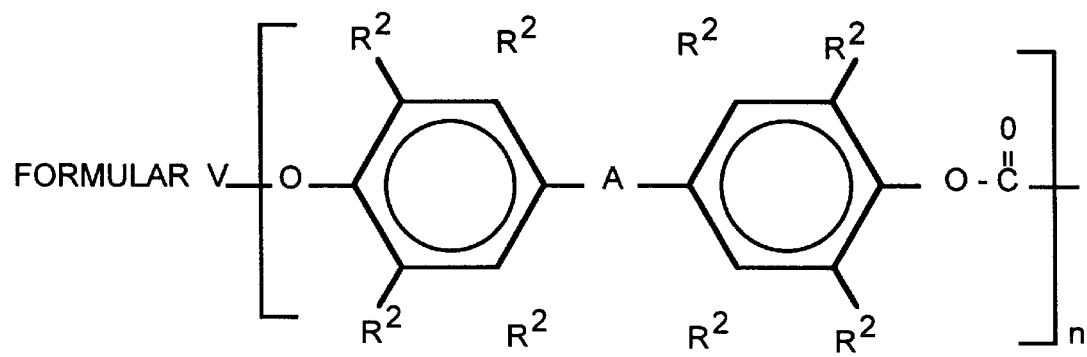

United States Patent

Sivaram et al.

[11] Patent Number: 5,807,964
[45] Date of Patent: Sep. 15, 1998

[54] PROCESS FOR THE PREPARATION OF POLYCARBONATES

[75] Inventors: Swaminathan Sivaram; Abbas-Alli Ghudubhai Shaikh, both of Pune, India

[73] Assignee: General Electric Company, Schenectady, N.Y.

[21] Appl. No.: 818,867

[22] Filed: Mar. 17, 1997

[51] Int. Cl.⁶ .................................................. C08G 64/00
[52] U.S. Cl. ........................................... 528/196; 528/198
[58] Field of Search ....................................... 528/196, 198

[56] References Cited

U.S. PATENT DOCUMENTS 5,104,963  4/1992  Westeppe et al. .
5,414,057  5/1995  Campbell et al. .

*Primary Examiner*—Terressa Mosley
*Attorney, Agent, or Firm*—Noreen C. Johnson; Douglas E. Stoner

[57] ABSTRACT

A process for the preparation of poly(arylcarbonate)s, relying on reaction of dialkyl carbonates with bisphenols and using selected organotin and oganotitanium catalysts. The process is preferably performed in a first step in which bisphenols and dialkyl carbonates are reacted using a catalyst to obtain an oligo(arylcarbonate). The oligo(arylcarbonate) then undergoes a post polycondensation in a second step, either by itself or with diphenyl carbonate. The second step also uses a catalyst. The process yields poly(arylcarbonate)s that are characteristically free of color and gel.

11 Claims, 1 Drawing Sheet n = 3 - 6 n = 50 - 125

FORMULAR I      $[R^1 R^2 Sn(OAr)]_2 O$

FORMULAR II     $R^3 O - \overset{\overset{O}{\|}}{C} - OR^3$

FORMULAR III

FORMULAR IV $n = 3 - 6$

FORMULAR V $n = 50 - 125$

PROCESS FOR THE PREPARATION OF POLYCARBONATES

FIELD OF THE INVENTION

This invention relates to an improved process for the preparation of poly(arylcarbonate)s. More particularly, it relates to the preparation of poly(arylcarbonate)s by the reaction of dialkyl carbonates with bisphenols using selected organotin and organotitanium catalysts.

DESCRIPTION OF THE RELATED ART

Poly(arylcarbonate)s, in general, and especially those derived from bisphenol A, are a class of important engineering thermoplastics useful in a variety of industrial and consumer applications. They are generally synthesized by either interfacial phosgenation of bisphenol A or by melt phase reaction of bisphenol A with diphenyl carbonate (D. Freitag et al, Encyclopedia of Polymer Science and Engineering, Vol. 11, 651 (1988). The interfacial process involves the use of toxic and hazardous phosgene. In addition, it uses a chlorinated hydrocarbon as solvent and requires disposal of chloride-containing solid wastes. Further, the product poly(arylcarbonate) contains residual sodium and chloride ions which adversely affect the hydrolytic stability of the product. The melt phase process using diphenyl carbonate is expensive, as the process for the manufacture of diphenyl carbonate is not very economical. Furthermore, residual phenol remaining in the product adversely affects the thermal stability of poly(arylcarbonate)s.

There are examples in the prior art where the reaction of bisphenols with dialkyl carbonates have been promoted by the use of certain specific catalysts. For example, according to Jap. Pat. 03 131627 (1991) and Jap. Pat. Appl. Hei 02 284918 (1990), alkali metal salts such as sodium methoxide and potassium borohydride can be used. But it is well known that alkali metal residues in poly(arylcarbonate)s adversely affect their hydrolytic stability. One of the more commonly used catalysts are organic derivatives of tin. For examples, Jap. Pat. 02 251522 (1990), Jap. Pat. Appl. Hei 02 251524 (1990) and Jap. Pat. Appl. Hei 02 251525 (1990) describe the use of di-n-butyltin oxide as catalysts. However, under the conditions specified, poly(arylcarbonate)s of molecular weight in the range of 300–1000 could only be obtained. Ger. Pat. 4,038,768 (1991) describes a two-stage process for the conversion of bisphenol A and diethyl carbonate to poly(arylcarbonate)s in presence of tin alcoholates as catalysts. However, tin alcoholates are not desirable catalysts, as they result in color formation during the reaction of phenols and DMC, as taught in U.S. Pat. No. 5,149,856 (1992). For this reason, Ger. Pat. 4,038,768 recommends washing the oligomer with ethanol to remove colored impurities. For the same reason, Ger. Pat. 4,038,768 avoids the use of catalysts in the second stage of polycondensation. Since no catalysts are employed, the polycondensation has to be conducted at 340° C. It is known that use of such high temperatures during polycondensation leads to undesirable gel formation and consequent reduction in yield. This is evident from Ger. Pat. 2,736,062 (1979), wherein using the same catalyst as described in Ger. Pat. 4,038,768 (1991), a light color polycarbonate was obtained. Furthermore, when polycondensation was conducted at 270° C., only low molecular weight (Mw=12,800) polymer was obtained. The yield was 60%. It is thus evident that the processes in the prior art suffer from various drawbacks mentioned in each of the prior art. Therefore, a need still exists for the development of a process for producing high molecular weight poly(arylcarbonate)s from bisphenols and dialkyl carbonates which is capable of producing colorless polymers in high yields (55–95%) without resorting to washing and at relatively low temperatures to avoid undesirable sidereaction such as degradation and gel formation.

It is, therefore, an object of the present invention to provide an improved process for the preparation of poly(arylcarbonate)s directly from bisphenols and dialkyl carbonates, which are readily available and relatively inexpensive, in the presence of compounds of the formula

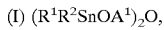

wherein each of $R^1$ and $R^2$ is $C_{1-12}$ alkyl and $A^1$ is unsubstituted or substituted aryl. However, reaction of phenols and bisphenols with dialkyl carbonates are thermodynamically unfavorable (D. Freitag et al. Angew. Chem. Int. Ed., Engl., 30, 1598 (1991). It has now been found, surprisingly, that when a tin compound of the formula I, as defined in the present specification, is used for the reaction of bisphenols with dialkyl carbonates high molecular weight, colorless poly(arylcarbonate)s are formed. The reaction is preferably conducted in two stages. In the first stage, bisphenols and dialkyl carbonates are reacted using a catalyst of formula I in the temperature range of 110°–200° C. to obtain an oligo(arylcarbonate) having the formula

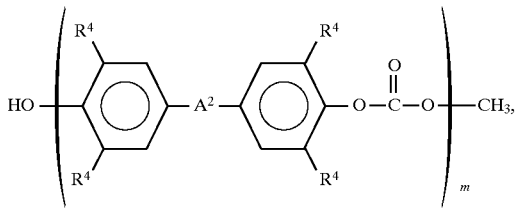

wherein $A^2$ is $C_{1-5}$ alkylene, $C_{2-5}$ alkylidene, $C_{5-6}$ cycloalkylene, O or S, $R^4$ is hydrogen or $C_{1-4}$ and m is 2–6,said oligo(arylcarbonate) having a mole % carbonate endgroups between 40–100%. The oligo(arylcarbonate) is then subjected to polycondensation in a separate step, either by itself or in the presence of a 2–10 wt % of diphenyl carbonate (based on oligomer), using a catalyst of formula I or a catalyst derived from organotitanium compounds at a temperature less than 280° C. and at a pressure of less than 0.1 mm of Hg to yield poly(arylcarbonate)s having an inherent viscosity of 0.2–0.5 dL/g and free of color and gel, said poly(arylcarobonate) having the formula

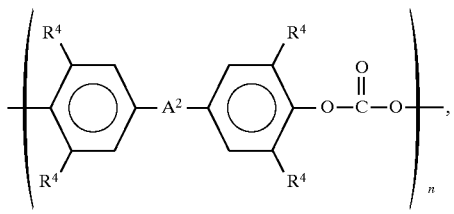

wherein $A^2$ and $R^4$ are as previously defined and n is 50–125.

In the compounds of formula I, each of $R^1$ and $R^2$ denotes a $C_1$–$C_{12}$ alkyl radical, which may be the same or different, and $A^1$ denotes an aryl radical, either substituted or unsubstituted.

Examples of organotin compounds which are particularly suitable for the process are: 1,3-diphenoxytetrabutyl distannoxane, 1,3-diphenoxytetraethyl distanoxane, 1,3-diphenoxytetramethyl distannoxane, 1,3-di-p- chlorophenoxy tetrabutyl distannoxane and 1,3-di-p-nitrophenoxy tetrabutyl distannoxane.

Dialkyl carbonates which may be used according to the invention are those of the formula II

in which $R^3$ represents a $C_1$–$C_{10}$ alkyl radical.

In another embodiment of the invention the preferred carbonates are dimethyl carbonate and diethyl carbonate, which are readily available by a phosgene-free process.

In yet another embodiment of the present invention bisphenols which may be suitable according to the invention are those of the

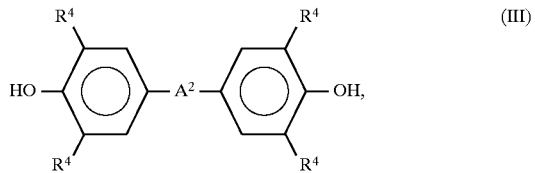

where $R^4$ denotes either H or a $C_1$–$C_4$ alkyl.

Examples of bisphenols which may be suitable for the invention are:

Bis(hydroxyphenyl)alkanes, bis(4-hydroxyphenyl) methane, 1, 1-bis(4-hydroxyphenyl)ethane, 2,2-bis(4-hydroxyphenyl) propane, 2,2-bis(4-hydroxyphenyl)butane, 2,2-bis(4-hydroxy-phenyl) octane, bis(4-hydroxyphenyl) phenylmethane, 2,2-bis(4-hydroxy-1-methylphenyl) propane,2,2-bis(4-hydroxy-t-butylphenyl)propane, and 2,2-bis(4-hydroxy-3-bromophenyl) propane; bis(hydroxyaryl) cycloalkanes such as 1,1-bis(4-hydroxyphenyl) cyclopentane, and 1,1-bis(4-hydroxyphenyl) cyclohexane; dihydroxyarylethers such as 4,4'-dihydroxyphenyl) ether and 4,4'-dihydroxy-3,3'-dimethyldiphenyl ether; dihydroxydiaryl sufoxides such as 4,4'-dihydroxydiphenyl sulfoxide and 4,4'-dihydroxy-3,3'-dimethyldiphenyl sulfoxide; and dihydroxydiaryl sulfones such as 4,4'-dihydroxydiphenyl sulfone and 4,4'-dilydroxy-3,3-dimethyldiphenyl sulfone. Of the compounds exemplified above, particularly preferred is 2,2-bis(4-hydroxyphenyl) propane.

The organotin compounds may be used in concentrations of $10^{-2}$ to $10^{-6}$ mole per mole of bisphenol A, the preferred amount being $10^{-2}$ to $10^{-5}$ mole per mole of bisphenol A. The dialkyl carbonate is preferably used in excess of the stoichiometry and preferably in amounts between two or three moles per mole of bisphenol employed.

The reaction temperature during the first stage of the reaction leading to the oligo(arylcarbonate) has to be carefully controlled in the range of 180°–240° C. to yield an oligomer of average degree of oligomerization equal to 2 to 6. During this stage, the pressure of the reaction can be between 1 atmosphere to 10 atmospheres. During the second stage polycondensation, the temperature should not exceed 280° C. The pressure is gradually reduced from 1 atmosphere to about 0.5 mm of Hg and finally attaining a value of 0.01 mm of Hg during the last stage of the reaction.

It has been found that either organotin compounds of formula I or organotitanium compounds can be used in the second stage. The organotitanium compounds can be chosen from the alkoxides and aryloxides of titanium. Specific examples are titanium isopropoxide, titanium-n-butoxide, titanium ethoxide, titanium phenoxide, titanium (p-chlorophenoxide), titanium (p-nitrophenoxide) and titanium (cresyloxide). The catalyst is generally used in the range of $10^{-2}$ to $10^{-6}$ mole per mole of oligo(arylcarbonate), the preferred amount being $10^{-2}$ to $10^{-5}$ mole per mole of oligo(arylcarbonate).

The main advantage of the present invention is that high molecular weight, color-free, gel-free poly(arylcarbonate)s with an inherent viscosity in the range of 0.2–0.5 are obtained by the reaction of bisphenol A and a dialkyl carbonate at temperatures below 280° C. The polycarbonates are free from chloride or alkali metal impurities and have a low hydroxyl content. Hence they are expected to show better hydrolytic and thermal stability.

The poly(arylcarbonate)s produced by the process of this invention are tested by methods described below and the results are given in the examples.

1) Inherent viscosity was measured at 30° C. using an ubbleohde viscometer in chloroform.

2) The degree of oligomerization was estimated using a vapor phase osmometer in chloroform at 35° C.

3) The hydroxyl number was estimated by UV-Visible spectrometry using the method recited in Macromolecules, 26, 1186 (1993).

4) The mole % carbonate endgroups in the oligomer was determined by $^1$H NMR spectroscopy by integrating the area under the peak at 3.9δ from methoxycarbonate and 4.8δ from the hydroxyl end groups.

The details of the invention are given in the examples below, which are provided by way of illustration only and, therefore, should not be construed to limit the scope of the invention.

EXAMPLE 1

1,3-Diphenoxytetrabutyl distannoxane (0.34 g) was dissolved in 11.4 g of bisphenol A at 150° C. under a stream of nitrogen. Dimethyl carbonate (9 g) was added dropwise over 30 minutes to the reaction mixture. The reaction temperature decreased to 110° C. The reaction mixture was refluxed for 8 hours and 6.6 mL of total distillate, consisting of byproduct methanol and dimethyl carbonate, was collected in 24 hours reaction time. The reaction temperature was gradually increased to 240° C. The oligo(arylcarbonate) mixture was freed from unreacted bisphenol A by 1 wt % cold alkali wash at room temperature. The oligo(arylcarbonate) obtained was a white powder. The yield of the oligo(arylcarbonate) obtained was 8.13 g (69%). The oligo(arylcarbonate) showed a degree of oligomerization of 6.4 with 43 mole % carbonate endgroups. The molecular weight of the oligo (arylcarbonate) was 1071 and the hydroxyl number was 8.7.

EXAMPLE 2

A mixture of bisphenol A (22.8 g), dimethyl carbonate (20.7 g) and 1,3-diphenoxytetrabutyl distanoxane (0.67 g) in a molar ratio of 1:2:0.05 was reacted at 150° C. A total distillate of 16 mL, consisting of byproduct methanol and dimethyl carbonate, was distilled in 24 hours reaction time. The reaction temperature was increased to 200° C. The oligo(arylcarbonate) mixture was freed from unreacted bisphenol A by 1 wt % cold alkali wash at room temperature. The oligo(arylcarbonate) obtained was a white powder. The yield of the oligo(arylcarbonate) obtained was 15.5 g (61%). The degree of oligomerization was 4. The mole % carbonate endgroups was 100. The molecular weight of the oligo (arylcarbonate) was 850 and the hydroxyl number was 8.1.

EXAMPLE 3

A mixture of bisphenol A (22.8 g), dimethyl carbonate (20.7 g) and 1,3-diphenoxytetrabutyl distannoxane (0.67 g) in a molar ratio of 1:2:0.05 was reacted at 150° C. A total distillate of 13 mL, consisting of byproduct methanol and dimethyl carbonate, was distilled in 16 hours reaction time. The reaction temperature was increased to 156° C. The oligo(arylcarbonate) mixture was freed from unreacted bisphenol A by 1 wt % cold alkali wash at room temperature. The oligo(arylcarbonate) obtained was a white powder. The yield of the oligo(arylcarbonate) obtained was 10.2 g (40%). The degree of oligomerization was 1.7. The mole % carbonate endgroups was 82. The molecular weight of the oligo(arylcarbonate) was 550 and the OH number was 6.4.

EXAMPLE 4

An oligo(arylcarbonate) of degree of oligomerization 6.4 (0.3 g, $2.8 \times 10^{-4}$ mole) and 1,3-diphenoxytetrabutyl distannoxane ($3.74 \times 10^{-4}$ g, $2.81 \times 10^{-7}$ mole) was introduced into a tubular glass reactor (i.d. 3 cm) under nitrogen atmosphere and heated in a silicone oil bath to 200° C. in 30 minutes. At this temperature the reaction was continued for 60 min under nitrogen. Thereafter the reactor was evacuated to 0.1 mm of Hg and held at 200° C. for 60 minutes. Further reaction was carried out at 230° C. for 45 minutes and at 250° C. and 280° C. for 30 minutes. The resulting polymer was cooled to room temperature, dissolved in chloroform, precipitated with methanol and dried in vacuo. The yield of the polymer was 0.2 g (71%) with an inherent viscosity of 0.38 dL/g in chloroform at 30° C. The polymer had a hydroxyl number of 2.1.

EXAMPLE 5

An oligo(arylcarbonate) of degree of oligomerization 3.3 (0.03 g, $4.37 \times 10^{-4}$ mole) and 1,3-diphenoxytetrabutyl distannoxane ($5.84 \times 10^{-4}$ g, $4.37 \times 10^{-7}$ mole) were introduced into a tubular glass reactor (i.d. 3 cm) under nitrogen atmosphere and heated in a silicone oil bath to 200° C. in 30 minutes. At this temperature the reaction was continued for 60 min under nitrogen. Thereafter the reactor was evacuated to 0.1 mm of Hg and held at 200° C. for 60 minutes. Further reaction was carried out at 230° C. for 45 minutes and at 250° C. and 280° C. for 30 minutes. The resulting polymer was cooled to room temperature, dissolved in chloroform, precipitated with methanol and dried in vacuo. The yield of the polymer was 0.19 g (69%) with an inherent viscosity of 0.39 dL/g in chloroform at 30° C. The polymer had a hydroxyl number of 2.3.

EXAMPLE 6

An oligo(arylcarbonate) of degree of oligomerization 1.7 (0.3 g, $5.45 \times 10^{-4}$ mole) and 1,3-diphenoxytetrabutyl distannoxane ($7.28 \times 10^{-4}$ g, $5.45 \times 10^{-7}$ mole) were introduced into a tubular glass reactor (i.d. 3 cm) under nitrogen atmosphere and heated in a silicone oil bath to 200° C. in 30 minutes. At this temperature the reaction was continued for 60 min under nitrogen. Thereafter the reactor was evacuated to 0.1 mm of Hg and held at 200° C. for 60 min. Further reaction was carried out at 230° C. for 45 minutes and at 250° C. and 280° C. for 30 minutes. The resulting polymer was cooled to room temperature, dissolved in chloroform, precipitated with methanol and dried in vacuo. The yield of the polymer was 0.15 g (57%) with an inherent viscosity of 0.23 dL/g in chloroform at 30° C. The polymer had a hydroxyl number of 4.2.

EXAMPLE 7

An oligo(arylcarbonate) of degree of oligomerization 6.4 (0.3 g, $2.8 \times 10^{-4}$ mole) and titanium isopropoxide ($7.96 \times 10^{-5}$ g, $2.8 \times 10^{-7}$ mole) were introduced into a tubular glass reactor (i.d. 3 cm) under nitrogen atmosphere and heated in a silicone oil bath to 200° C. in 30 minutes. At this temperature the reaction was continued for 60 minutes under nitrogen. Thereafter the reactor was evacuated to 0.1 mm of Hg and held at 200° C. for 60 minutes. Further reaction was carried out at 230° C. for 45 min and at 250° C. for 30 minutes and at 280° C. for 45 minutes. The resulting polymer was cooled to room temperature, dissolved in chloroform, precipitated with methanol and dried in vacuo. The yield of the polymer was 0.21 g (75%) with an inherent viscosity of 0.33 dL/g in chloroform at 30° C. The polymer had a hydroxyl number of 2.3.

EXAMPLE 8

An oligo(arylcarbonate) of degree of oligomerization 6.4 (0.3 g, $2.8 \times 10^{-4}$ mole), diphenyl carbonate (0.03g, $1.6 \times 10^{-4}$ mole) and 1,3-diphenoxytetrabutyl distannoxane ($3.74 \times 10^{-4}$ g, $2.81 \times 10^{-7}$ mole) were introduced into a tubular glass reactor (i.d. 3 cm) under nitrogen atmosphere and heated in a silicone oil bath to 200° C. in 30 minutes. At this temperature the reaction was continued for 60 minutes under nitrogen. Thereafter the reactor was evacuated to 0.1 mm of Hg and held at 200° C. for 60 minutes. Further reaction was carried out at 230° C. for 45 minute and 250° C. for 30 minutes and at 280° C. for 45 minutes. The resulting polymer was cooled to room temperature, dissolved in chloroform, precipitated with methanol and dried in vacuo. The yield of the polymer was 0.24 g (94%) with an inherent viscosity of 0.41 dL/g in chloroform at 30° C. The polymer had a hydroxyl number of 2.2.

EXAMPLE 9

An oligo(arylcarbonate) of degree of oligomerization 6.4 (0.3 g, $2.8 \times 10^{-4}$ mole), diphenyl carbonate (0.03 g, $1.6 \times 10^{-4}$ mole) and titanium isopropoxide ($7.96 \times 10^{-5}$ g, $2.81 \times 10^{-7}$ mole) were introduced into a tubular glass reactor (i.d. 3 cm) under nitrogen atmosphere and heated in a silicone oil bath to 200° C. in 30 minutes. At this temperature the reaction was continued for 60 minutes under nitrogen. Thereafter the reactor was evacuated to 0.1 mm of Hg and held at 200° C. for 60 minutes. Further reaction was carried out at 230° C. for 45 minute and 250° C. for 30 minutes and at 280° C. for 45 minutes. The resulting polymer was cooled to room temperature, dissolved in chloroform, precipitated with methanol and dried in vacuo. The yield of the polymer was 0.22 g (88%) with an inherent viscosity of 0.37 dL/g in chloroform at 30° C. The polymer had a hydroxyl number of 2.2.

We claim:

1. A process for the preparation of poly(arylcarbonate) which comprises:

heating a mixture of bisphenol, dialkyl carbonate and a polycondensation catalyst which is an organotin compound of the formula $$(R^1R^2SnOAr)_2O, \tag{I}$$

wherein each of $R^1$ and $R^2$ is $C_{2-12}$ alkyl and Ar is unsubstituted or substituted aryl, at a temperature in the range of 110°–240° C. to obtain an oligo(arylcarbonate), and polycondensing said oligo(arylcarbonate) at a temperature up to 280° C. while gradually reducing the pressure to about 0.1 mm of Hg in the presence of an organotin catalyst of formula I or an organotitanium polycondensation catalyst.

2. A process as claimed in claim 1 wherein the dialkyl carbonate is dimethyl, diethyl, di-n-butyl, di-tert-butyl, diamyl, diheptyl, dihexyl or dicyclopropyl carbonate.

3. A process as claimed in claim 1 wherein the molar proportion of dialkyl carbonate is at least twice that of the bisphenol.

4. A process as claimed in claim 1 wherein the polycondensation catalyst has formula I.

5. A process as claimed in claim 1 wherein the polycondensation catalyst is an alkoxide or aryloxide of titanium.

6. A process as claimed in claim 1 wherein the polycondensation is conducted in the presence of diphenyl carbonate.

7. A process for the preparation of a poly(arylcarbonate) comprising:

heating at a temperature in the range of 110°–240° C. a mixture of a bisphenol of the formula

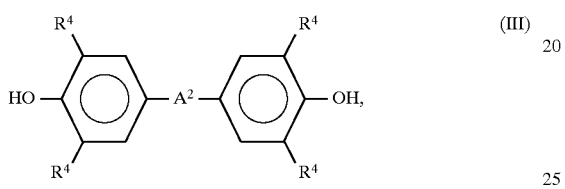

an organotin catalyst of the formula

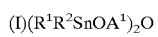

(I)$(R^1R^2SnOA^1)_2O$ and a dialkyl carbonate of the formula

(II)

wherein:

each of $R^1$ and $R^2$ is a $C_1$–$C_{12}$ alkyl radical which may be the same or different;

$R^3$ is a $C_1$–$C_{10}$ alkyl radical;

$R^4$ is methyl, ethyl, bromo or chloro;

$A^1$ is an unsubstituted or substituted aryl radical;

$A^2$ is isopropylidene, methylene, hexafluroisopropylidene, ethylidene, isobutylmethylene, diphenymethlene, phenylmethlmethylene, phthalimide, N-phenylphalimide, N-methylphthalimide, dihydroanthracene, indane, spirobisindane, thiphene, azo, dimethldiphenysilane, tetraphenysilane, hydroquinoid, cyclohexane, sulfide, sulfone, sulfoxide, ketone, ester or amine;

distilling slowly alcohol produced as an azeotrope with the dialkyl carbonate, for a period of 8 to 24 hours to obtain an oligo(arylcarbonate) of the formula

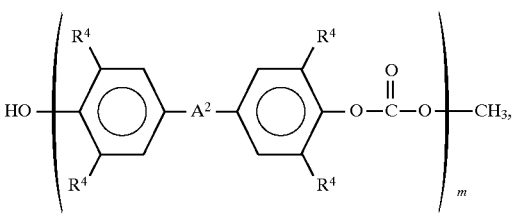

wherein m is 3–6, said oligo(arylcarbonate) having a mole % carbonate endgroups between 40% and 100%;

increasing the temperature to 200°–260° C. to distill unreacted dialkyl carbonate;

optionally washing the oligo(arylcarbonate) free of any unreacted phenols with 1 wt % alkali at room temperature;

polycondensing the oligo(arylcarbonate) at a temperature not exceeding 280° C.; and slowly increasing the temperature in stages, while decreasing the pressure from 760 to 0.1 torr, for a duration of 3 to 5 hours in the presence of an organotin or an organotitanium catalyst, present in the range of $10^{-2}$ to $10^{-6}$ mole per mole of oligo(arylcarbonate), to produce said poly(arylcarbonate) having the formula

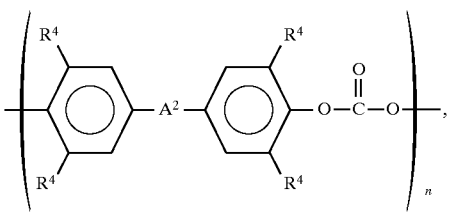

wherein n is 50–125.

8. A process as claimed in claim 7 wherein the catalyst for the preparation of oligo(arylcarbonate) is a distannoxane selected from the group consisting of 1,3-diphenoxytetrabutyl distannoxane, 1,3-diphenoxytetraethyl distannoxane, 1,3-diphenoxytetramethyl distannoxane, 1,3-di-p-chlorophenoxytetrabutyl distannoxane and 1,3-di-p-nitrophenoxy tetrabutyl distannoxane.

9. A process as claimed in claim 7, wherein the final temperature is in the range of 180°–240° C. during the preparation of the oligo(arylcarbonate).

10. A process as claimed in claim 7, wherein the oligo(arylcarbonate) is polycondensed to the poly(arylcarbonate) at a temperature in the range of 100°–280° C., at a pressure in the range of 760 to 0.1 mm of Hg, and in a reaction time between 3 to 5 hours.

11. A process as claimed in claim 7, wherein the poly(arylcarbonate) has a hydroxyl number between 2 and 4.

* * * * *